(12) United States Patent
Watanabe et al.

(10) Patent No.: US 6,646,691 B1
(45) Date of Patent: Nov. 11, 2003

(54) ACTIVE-MATRIX IN-PLANE SWITCHING MODE LCD PANEL HAVING MULTIPLE COMMON ELECTRODE VOLTAGE SOURCES

(75) Inventors: Makoto Watanabe, Tokyo (JP); Takahiko Watanabe, Tokyo (JP)

(73) Assignee: NEC LCD Technologies, Ltd., Kanagawa (JP)

(*) Notice: Subject to any disclaimer, the term of this patent is extended or adjusted under 35 U.S.C. 154(b) by 292 days.

(21) Appl. No.: 09/626,114

(22) Filed: Jul. 26, 2000

(30) Foreign Application Priority Data

Jul. 26, 1999 (JP) .......................................... 11-210754

(51) Int. Cl.[7] .......................................... G02F 1/1343
(52) U.S. Cl. .......................... 349/39; 349/34; 349/141; 349/192
(58) Field of Search ............................. 349/141, 39, 34, 349/192

(56) References Cited

U.S. PATENT DOCUMENTS 6,201,590 B1 * 3/2001 Ohta et al. ................. 349/141
6,229,510 B1 * 5/2001 Kim et al. ..................... 345/87
6,456,350 B1 * 9/2002 Ashizawa et al. .......... 349/141

FOREIGN PATENT DOCUMENTS

| JP | 5-224235 | 9/1993 |
| JP | 8-211411 | 8/1996 |
| JP | 10-62802 | 3/1998 |
| WO | WO96/00408 | 1/1996 |

* cited by examiner

Primary Examiner—Robert H. Kim
Assistant Examiner—Andrew Schechter
(74) Attorney, Agent, or Firm—McGinn & Gibb, PLLC

(57) ABSTRACT

An in-line switching mode LCD panel has three groups of common electrode lines corresponding to three colors defined by color layers in the pixels. The potentials of the groups of the common electrode lines are adjusted independently of one another so that the flicker level for the corresponding pixels assumes a minimum by compensating the difference in the feed-through voltage between the pixels.

9 Claims, 15 Drawing Sheets

ACTIVE-MATRIX IN-PLANE SWITCHING MODE LCD PANEL HAVING MULTIPLE COMMON ELECTRODE VOLTAGE SOURCES

BACKGROUND OF THE INVENTION (a) Field of the Invention

The present invention relates to an active-matrix in-plane switching mode LCD panel, and more particularly, to an improvement of an active-matrix LCD (liquid crystal display) panel driven by an in-plane electric field.

(b) Description of the Related Art

LCD panels are generally categorized by the mode of the liquid crystal into a plurality of types including one driven by a perpendicular electric field, such as a TN-mode (twisted nematic mode) LCD panel. In this mode of the LCD panel, the orientations of the directors (axes) of the LC molecules are changed by application of a perpendicular electric field which is normal to the substrate surface, to thereby control the transparency thereof (or transmittance of light passing therethrough) for image display on the display panel. This mode of the LCD panel, however, has the drawback of a narrow viewing angle wherein the refractive index of the LC layer largely depends on the viewing angle for the LCD panel, because the directors of the LC molecules are oriented in the direction normal to the substrate surface during application of the drive voltage. Thus, this mode of the LCD panel is not suited for a variety of applications which require a wider viewing angle.

On the other hand, another mode of the LCD panel, known as an in-plane switching mode LCD panel, has a higher viewing angle and provides a higher image quality. In this mode of the LCD panel, the directors of the LC molecules are initially oriented in the direction parallel to the substrate surface and applied with the lateral (in-plane) electric field to be rotated in a plane parallel to the substrate surface for controlling the light transmittance. Thus, the in-plane switching mode LCD panel is extensively studied and developed in recent days. It is known that the wider viewing angle and the higher image quality result from the extremely small dependency of the change in the refractive index of the LC layer on the viewing angle.

FIG. 1 shows the LCD panel (or LCD panel assembly) of an in-plane switching mode LCD device in a front view. The LCD panel assembly includes a plurality of scanning lines 502 extending in a column direction and driven by an external driver, a plurality of video signal lines 103 extending in a row direction perpendicular to the scanning lines 502, a plurality common electrode lines 106 extending parallel to the scanning line 502, and a plurality of pixel elements arranged in a matrix and each defined by a pair of adjacent scanning lines 502 and a pair of adjacent video signal lines 103. Each pixel element includes a TFT (thin film transistor) 503 acting as a switching transistor and an associated pixel electrode 104 connected to the source of the TFT 503. The common electrode line 106 has a pair of branches acting as common electrode 106A for each pixel element and extending parallel to the pixel electrode 104. The voltage applied between the pixel electrode 104 and the common electrode 106A generates a lateral electric field or in-plane electric field in each pixel element parallel to the substrate surface.

Referring to Fig. FIG. 2 taken along line II—II in FIG. 1, the LCD panel assembly, generally designated by numeral 300, includes a TFT panel 100 and a counter panel 200 sandwiching therebetween a LC layer 107. The TFT panel 100 includes a TFT glass substrate 102, and, for each pixel, the common electrode 106A formed thereon, the pixel electrode 104 and the video signal line 103 formed thereon with an intervention of a gate insulator film 130. The pixel electrodes 104 and the signal lines 103 are disposed on the TFT panel 100 alternately with each other and covered with a protective insulator film 110, on which a first orientation film 120 is formed by coating and rubbing. The first orientation film 120 has a function for determining the orientation of the LC molecules in the LC layer 107 in the vicinity of the orientation film 120.

The counter panel 200 includes a counter glass substrate 101, a shield film 203 formed on the inner surface of the counter glass substrate 101 and having an opening for each pixel, a color layer 142 formed on the counter glass substrate 101 at each opening, a planarizing film 202 formed on the color layer 142, and a second orientation film 202 formed on the planarizing film 202 by coating and rubbing. The direction of the rubbing in the second orientation film 202 is opposite to the direction of the rubbing in the first orientation film 120.

Between the TFT panel 100 and the counter panel 200 are disposed the LC layer 107 and ball spacers 302, the ball spacers 302 having a diameter for defining the distance or gap between the TFT panel 100 and the counter panel 200. A first polarizing film 145 is formed on the outer surface of the TFT glass substrate 102 so that the light transmission axis of the polarizing film 145 is perpendicular to the direction of the rubbing in the orientation film 120. A second polarizing film 143 is formed on the outer surface of the counter substrate 101 so that the light transmission axis of the polarizing film 143 is perpendicular to the light transmission axis of the first polarizing film 145.

FIG. 3 shows a schematic block diagram of the LCD device having the LCD panel (assembly) 300 of FIG. 1, wherein the LCD panel 300 is placed on a back light 400 and driven by a LCD driver 500. The LCD driver 500 supplies scanning signals, video signals and a potential for the common electrode line to the LCD panel 300.

FIG. 4 shows an equivalent circuit diagram of the LCD panel assembly of FIG. 1. The scanning signals, the video signals and the common electrode potential are supplied from the LCD driver 500 shown in FIG. 3 to the scanning lines G1 to Gn, video signal lines D1 to Dn and the common electrode line COM, respectively. The common electrode potential is controlled by a variable voltage source ECOM in the LCD driver.

When one of the scanning lines G1 to Gn assumes a higher potential, the TFTs of the pixel elements disposed in a corresponding row are turned on, whereby electric charge flows from the video signal lines D1 to Dn into the corresponding pixel electrodes P1. This generates a specific voltage between the common electrode line 106 and the corresponding pixel electrodes 104, thereby generating an electric field between the pixel electrode 104 and the common electrode 106A. As a result, a portion of the LCD layer 107 interposed between both the panels 100 and 200 and located between both the electrodes 104 and 106A as viewed perpendicular to the substrate surface rotates parallel to the substrate surface, whereby the electro-optics effect of the LCD layer 107 allows image display based on the video signals.

FIG. 5 shows the distribution of the electric field generated in the pixel. The capacitance involved between the pixel electrode 104 and the common electrode 106A is considered to include a first, LC layer capacitance $C_{LC}$ which depends on the orientation of the LC layer 107 and a second, storage capacitance $C_{SC}$ which is constant, although both the capacitances are difficult to be separated. The sum of the capacitances $C_{LC}$ and $C_{SC}$ or the total capacitance between both the electrodes 104 and 106A can be obtained by the following formula:

$$\int_{v}^{D}\int_{0}^{D}\overline{E}\cdot d\overline{D}dv = \frac{1}{2}(C_{Lc} + C_{SC})V^2 \qquad (1)$$

wherein the integration with respect to "v" is conducted in the entire area for the LCD panel assembly, and E, D and V denote the electric field vector, the electric displacement vector and the voltage between the pixel electrode 104 and the common electrode line 106, respectively.

As understood from formula (1), the total capacitance depends on the medium through which the electric lines of force pass and the number of such electric lines of force. In FIG. 5, the electric lines of force "a", "b", "c" and "d" pass mainly the counter glass substrate 101, the color layer 142, the LC layer 107 and the TFT glass substrate 102, respectively.

The color layer 142 is made of one of three pigments defining three primary colors including red (R), green (G) and blue (B), and the respective color layers are arranged with a specific rule in the LCD panel assembly, as will be described later with reference to FIG. 10. It is to be noted that each pigment among the three pigments has a specific dielectric constant and a specific thickness denoted by "$d_C$" in FIG. 5. If an anthraquinone family pigment is used for the red film and a copper phthalocyanine family pigment is used for the green and blue films, then the red, green and blue films assume dielectric constant of 3.3, 3.9 and 4.5, respectively. This means that the capacitance $C_{SC}$ depends on the color of the pixel itself. The color may also cause a difference around 0.2 to 0.5 μm in the film thickness depending on the desired hue. Thus, the thickness "$d_g$" of the LC layer 107 also depends on the color, and accordingly the capacitance $C_{LC}$ also depends on the color. In short, different colors provide different LC layer capacitances $C_{LC}$ and different storage capacitances $C_{SC}$ to the pixel elements.

FIG. 6 shows a sectional view taken along line VI—VI in FIG. 1, with an abbreviation of the counter panel 200. In the active-matrix LCD panel having TFT pixel elements, a parasitic gate-to-source capacitance Cgs is formed in the overlapping region between the scanning line 502 and the pixel electrode 104. FIG. 7 shows an equivalent circuit for the pixel element, wherein the gate-to-source capacitance Cgs between the scanning line 502 and the pixel electrode 104 as well as the LC layer capacitance $C_{LC}$ and the storage capacitance $C_{SC}$ between the pixel electrode 104 and the common electrode 106A is depicted.

Referring to FIG. 8 showing potential waveforms of the signals for the pixel element, when the scanning line 502 assumes a higher potential level, the potential of the pixel electrode 104 approaches the potential "D" of the video signal line 103 due to the accumulation of the electric charge thereon. If the potential of the scanning line 502 falls at this stage to turn off the TFT, the potential of the pixel electrode 104 slightly falls because the pixel electrode 104 follows the potential fall of the scanning line 502 due to the parasitic capacitance Cgs. This potential fall ΔV is generally called feed-through voltage, which is obtained approximately by the following formula:

$$\Delta V = \frac{C_{GS}}{C_{GS} + C_{Lc} + C_{SC}}(V_{gon} - V_{goff}) \qquad (2)$$

wherein $V_{gon}$ and $V_{goff}$ are the higher potential level and the lower potential level, respectively, of the potential "G" of the scanning line 502.

In general, the LCD panel has a configuration such that an alternating voltage is applied between the common electrode 106A and the pixel electrode 104 if noted in a single pixel, the alternating voltage changing its polarity every frame period. Since the orientation of the LC layers 107 depends on the video signal which differs between pixels, the feed-through voltage ΔV depends on the state of the pixel image ranging from white through dark to black colors. Thus, the common electrode line 106 is in general applied with a median voltage which is a central voltage between the highest level and the lowest level of the video signal, the central voltage allowing a highest sensitivity to eye and thereby preventing a flicker.

The feed-through voltage ΔV obtained from equation (2) is in fact changed if the scanning signal "G" has a delay or do not have a sharp rise edge in the waveform thereof, as detailed below. If the scanning signal "G" has a delay, such as shown in FIG. 9A compared to the case of FIG. 9B which does not involve a delay, current flows into the pixel electrode 104 for a short time period after the instant at which the scanning signal "G" falls from a high level to a low level. The current continues to flow until the potential of the scanning signal "G" falls down to the threshold voltage Vth at which the TFT is turned off. Assuming that t0 and t1 are time instants at which the potential of the scanning signal "G" is switched from the high level to the low level and at which it actually falls down to the threshold voltage Vth, respectively, the feed-through voltage ΔV in this case can be expressed as follows:

$$\Delta V = \frac{C_{GS}}{C_{GS} + C_{Lc} + C_{SC}}(V_{gon} - V_{goff}) - \int_{t0}^{t1}\frac{I(t)}{C_{GS} + C_{LC} + C_{SC}}dt \qquad (3)$$

wherein I(t) is the current at a time instant "t" residing between the time instants t0 and t1.

It is to be noted that the scanning signal "G" has a larger delay at the distal end of the scanning line 502 as shown in FIG. 9A compared to the proximal end thereof as shown in FIG. 9B. Thus, the feed-through voltage ΔV is larger at the pixels in the vicinity of the proximal end of the scanning line as shown in FIG. 9B compared to the pixels in the vicinity of the distal end thereof as shown in FIG. 9A.

As understood from formula (1), the total capacitance $C_{LC}+C_{SC}$ depends on the medium through which the electric line of force passes. In the conventional in-plane switching mode LCD panel described above, since the counter panel 200 does not mount thereon transparent electrodes, the electric field generated between the pixel electrode and the common electrode enters the color layer 142. The difference in the film thickness and in the dielectric constant between the different color layers generates a difference in the field-through voltage ΔV between the different color layers 142. Thus, if the potential of the common electrode line is adjusted to compensate the feed-through voltage for one of the three color layers to cancel the flicker, the flicker will appear in the pixels having the other two of the three color layers. The DC voltage component generating the flicker in the other two of the color layers also causes the burning, irregularity and stains in the pixels to degrade the reliability of the LCD panel.

In addition, as described before with reference to formula (3), the delay of the scanning signal causes the difference in the feed-through voltages ΔV between pixels due to the difference in the time instant t1. This delay increases with the increase of the time constant of the scanning signal line, which increases with a higher resolution or the increase of the dimensions of the LCD panel. The time constant my be reduced to some extent by a larger width of the scanning signal line, which however decreases the ratio of the area for the opening to the entire pixel area and thus decreases the brightness of the screen or increases the power dissipation of the LCD panel, thereby degrading the performance of the LCD panel.

Patent Publication JP-A-5-224235 describes, in a LCD panel acting for a perpendicular electric field and thus not in an in-plane switching mode, a transparent common electrode mounted on the counter panel is divided into a plurality of common electrodes, and the divided common electrodes are applied with different potentials. However, a lower accuracy of the relative locations between the TFT panel and the counter panel necessitates a larger shield area between the pixels, and reduces the light transmittance.

In addition, division of the common electrode increases the patterning steps for the common electrode. It is to be noted that a fine patterning for the transparent electrode is difficult to achieve due to the material itself. The increase in the number of electric leads between the TFT panel and the counter panel complicates the fabrication process. In an in-plane switching mode LCD panel, the common electrode line formed on the TFT panel does not cause the problems of fine patterning or increase in the electric leads between the panels.

Some patent publications JP-A-8-211411, JP-A-10-62802, and WO96/00408 describe in-plane switching mode LCD devices wherein common electrode lines are applied with respective voltages. However, there is no teaching that teaches the application of respective voltages to the common electrode lines for the purpose of correction of the irregularity in the feed-through voltage of the pixels having different color layers, the irregularity being caused by the pulse delay of the scanning signal.

SUMMARY OF THE INVENTION

It is therefore an object of the present invention to provide a LCD panel generating a less flicker level and capable of reducing burning, irregularity and stains in the pixels.

The present invention provides a LCD panel assembly including a first panel, a second panel and a LCD layer sandwiched therebetween, the first panel including a first substrate, and a plurality of pixel elements arranged in a matrix on the first substrate and each including a TFT, a pixel electrode and a common electrode, the pixel electrode and the common electrode generating therebetween a lateral electric field parallel to a surface of the first substrate, a plurality of common electrode lines each connected to a corresponding common electrode, a plurality of scanning lines each disposed for a corresponding row of the pixel elements and connected to gates of the TFTs in the corresponding row, and a plurality of video signal lines each disposed for a corresponding column of the pixel elements and connected to source/drain paths of the TFTs in the corresponding column, the scanning lines form a plurality of groups each corresponding to the pixel elements having an equal total capacitance between the pixel electrode and the common electrode in the pixel element, each of the groups being applied with a separate voltage independently of voltages applied to other of the groups.

In accordance with the present invention, the groups of the common electrode lines can be applied with respective voltages so that the flicker level of the pixels connected to each group of the common electrode lines assumes a minimum by compensating the difference in the feed-through voltage between the pixels.

The above and other objects, features and advantages of the present invention will be more apparent from the following description, referring to the accompanying drawings.

PREFERRED EMBODIMENT OF THE INVENTION

Figure 1:
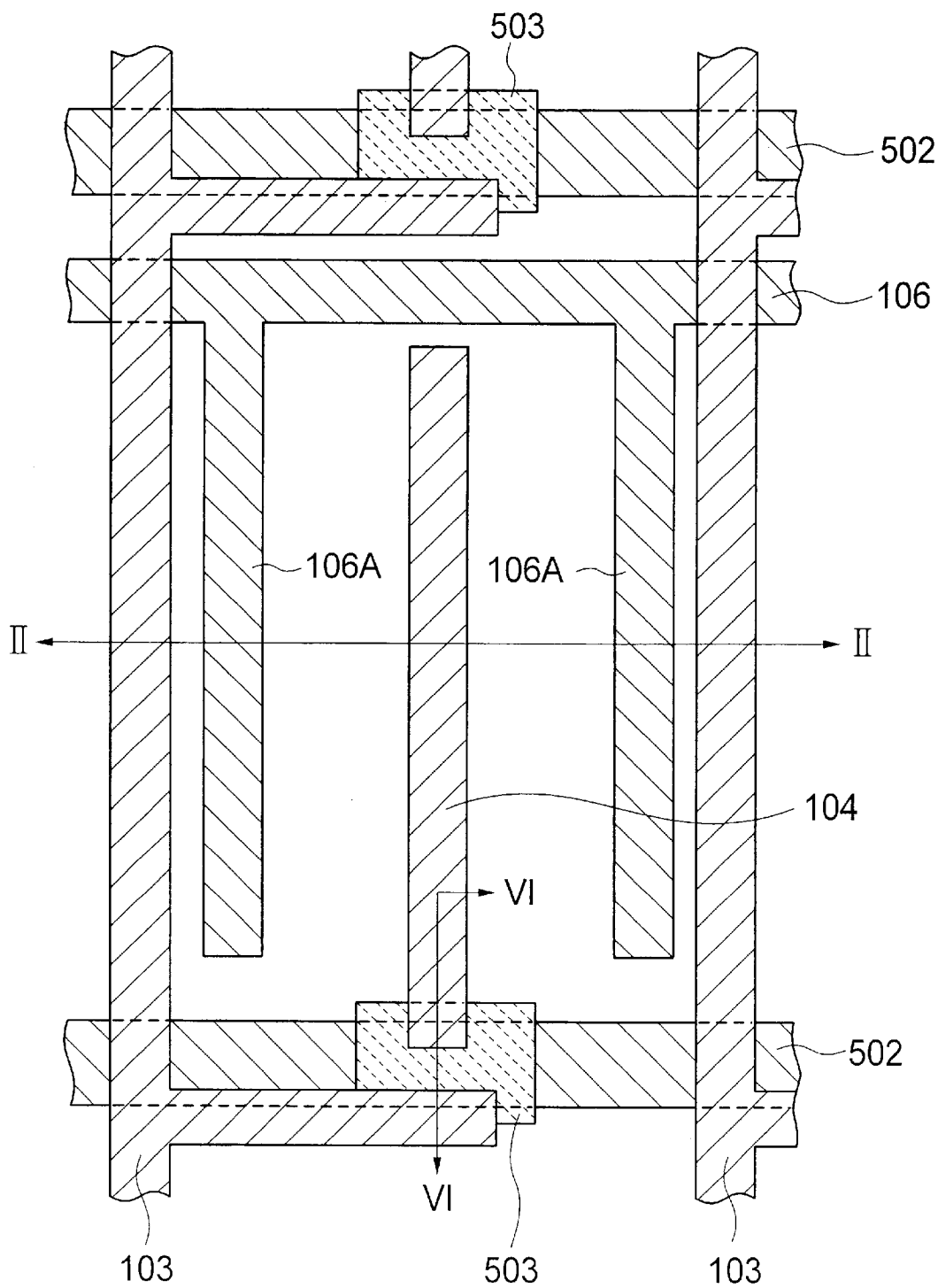
FIG. 1 is a front view of a pixel in a conventional in-plane switching mode LCD panel.

Now, the present invention is more specifically described with reference to accompanying drawings, wherein similar constituent elements are designated by related reference numerals throughout the drawings.

In-plane switching mode LCD panels according to embodiments of the present invention have configurations similar to the conventional in-plane switching mode LCD panel except for the differences as detailed below. The configurations of the embodiments which are not described in detail here are similar to those described with reference to FIGS. 1 to 7 for the conventional LCD panel, the descriptions of which are incorporated herein by reference except for the differences.

Figure 10:
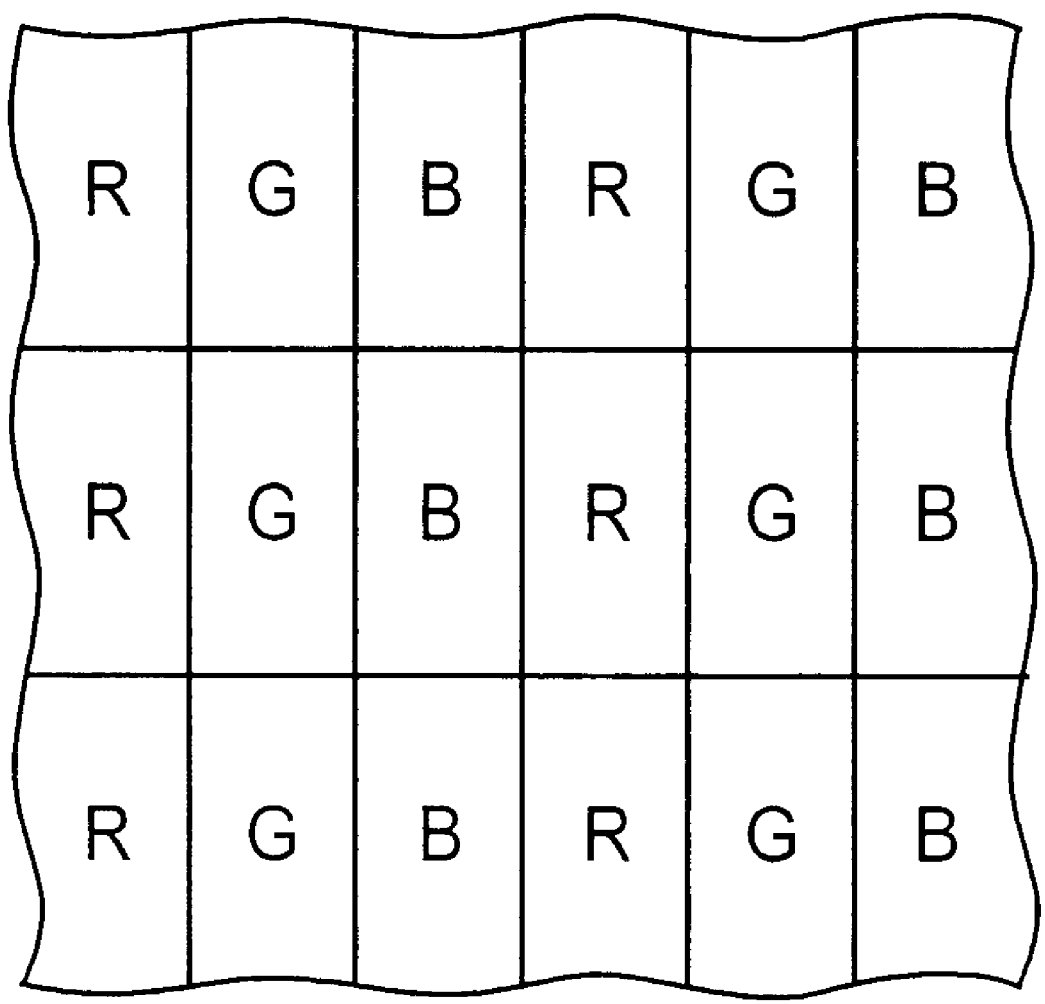
FIG. 10 is a partial front view of a LCD panel according to a first embodiment of the present invention for showing the arrangement the pixel colors in the LCD panel.

A LCD panel according to a first embodiment of the present embodiment has an array of pixels having respective color layers, and the arrangement of color layers for respective pixels are shown in FIG. 10, as an example. Specifically, three "R", "G" and "B" colors appear consecutively or alternately in the row direction of the array of pixels, with one of the three colors iteratively appearing along the column direction.

Figure 4:
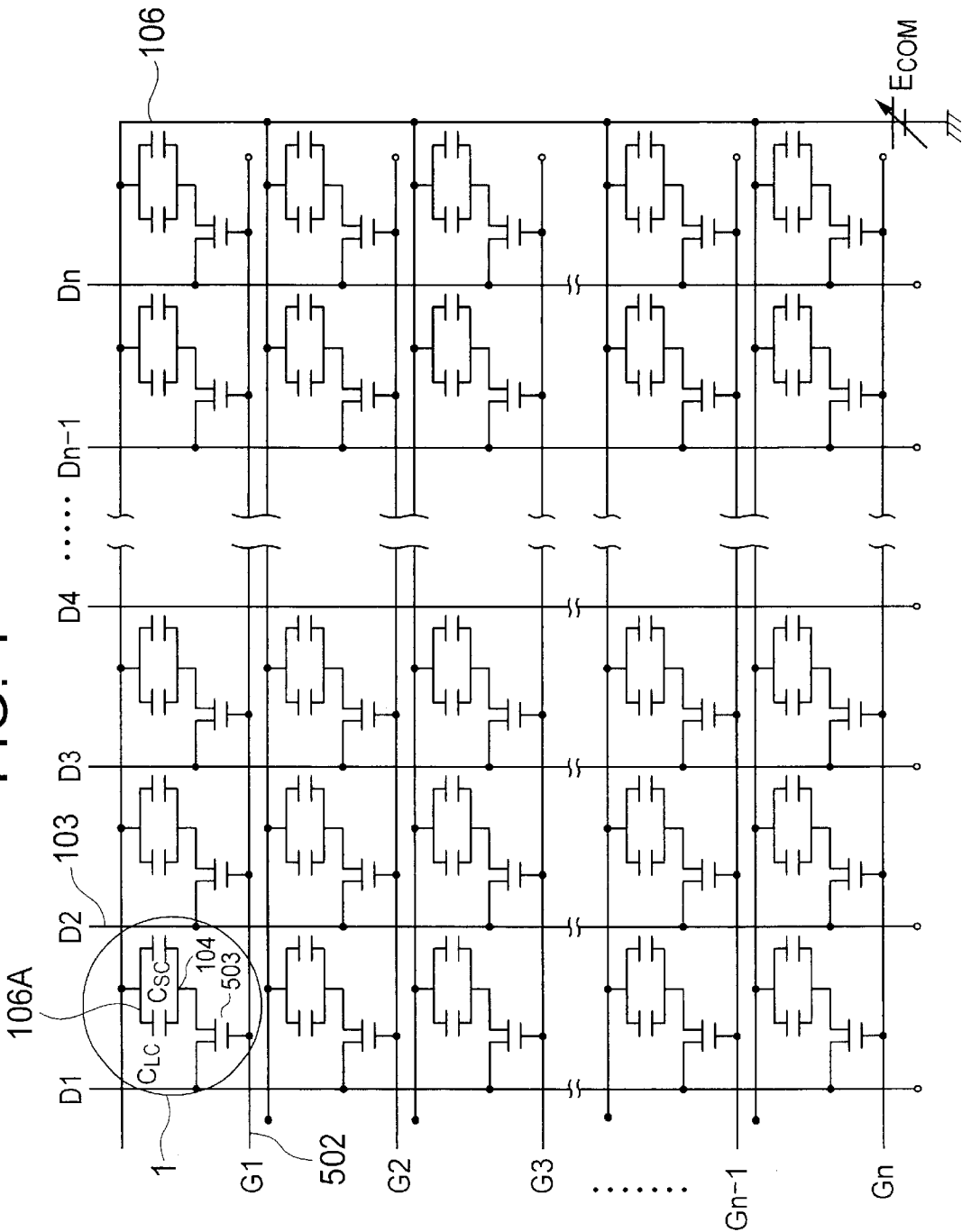
FIG. 4 is an equivalent circuit diagram for the LCD panel of FIG. 1.
Figure 5:
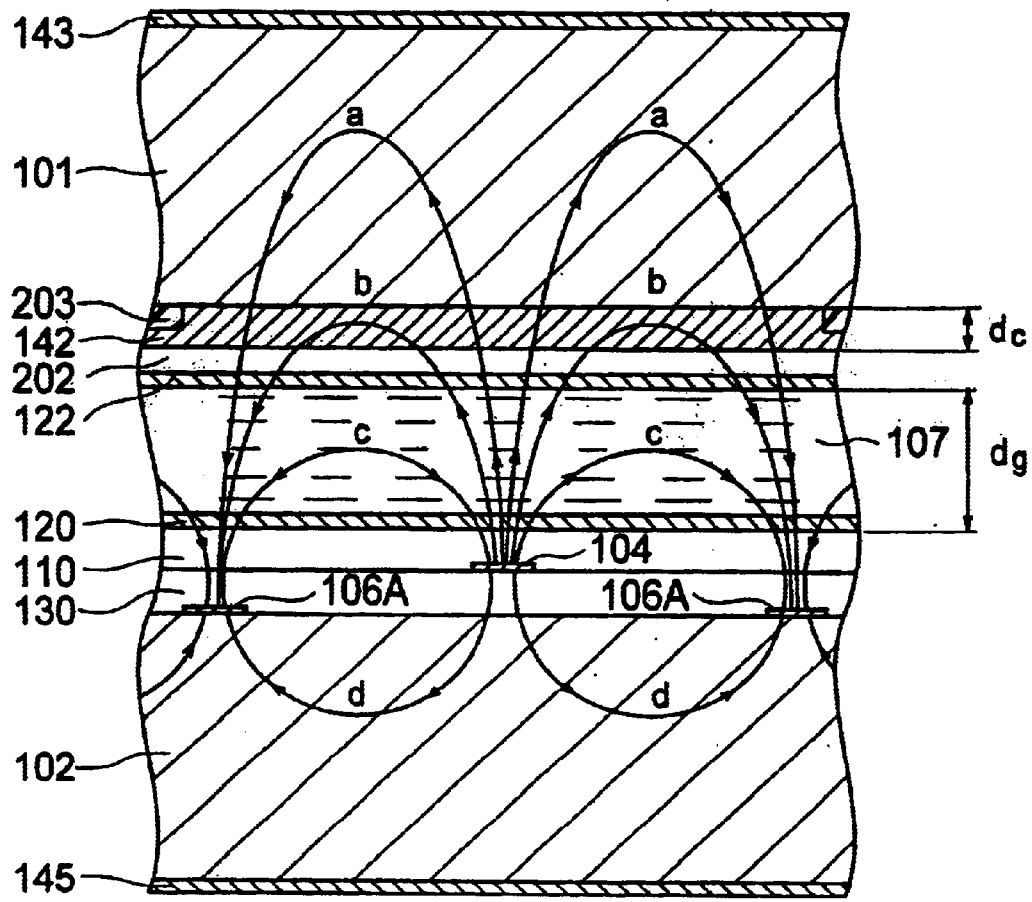
FIG. 5 is a sectional view for showing distribution of the electric line of force in a general in-plane switching mode LCD panel.
Figure 6:
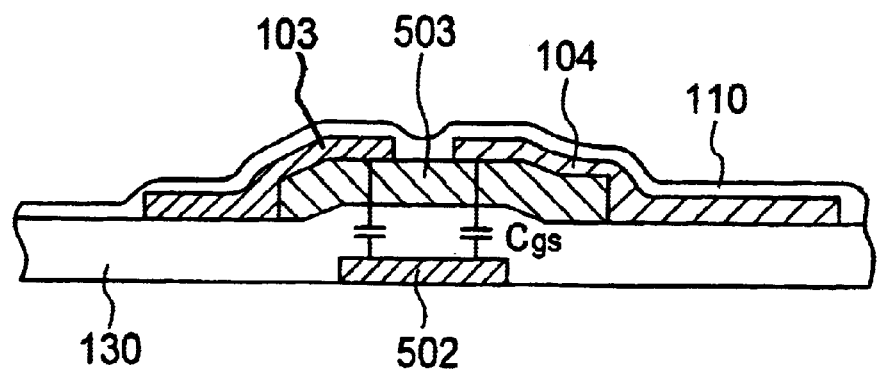
FIG. 6 is a sectional view taken along line VI—VI in FIG. 1.
Figure 7:
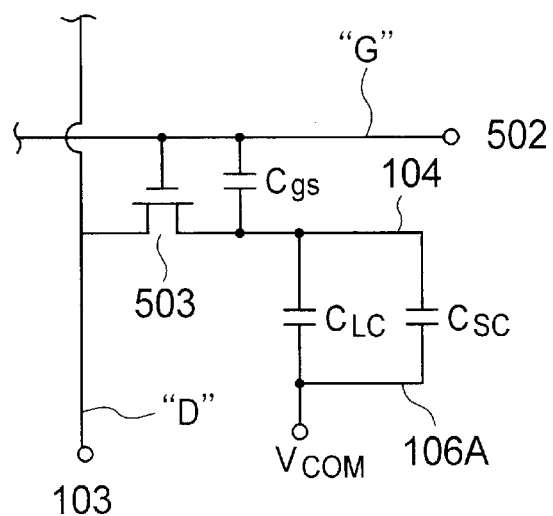
FIG. 7 is an equivalent circuit diagram for each pixel in the LCD panel of FIG. 1.
Figure 8:
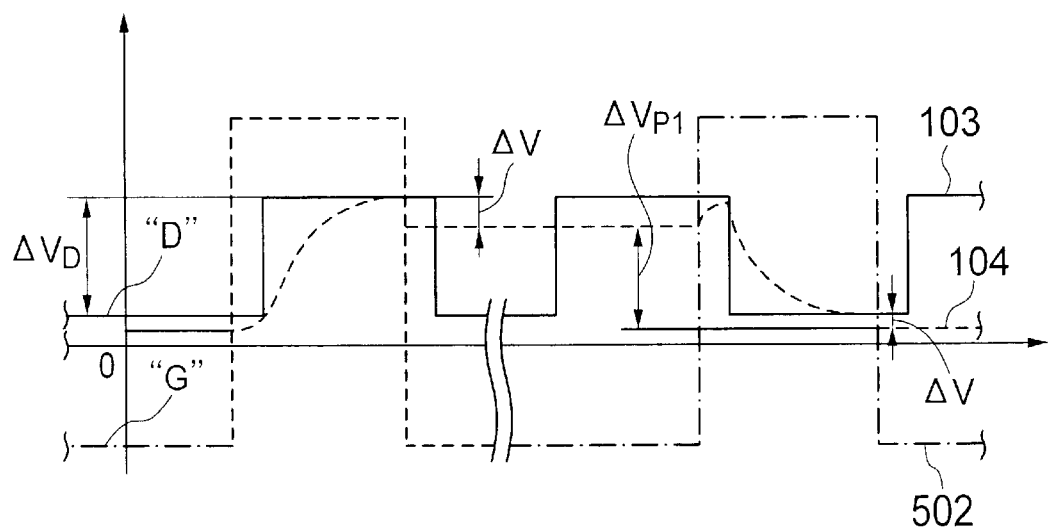
FIG. 8 is a waveform diagram of the signals in the LCD panel of FIG. 1.
Figure 9A:
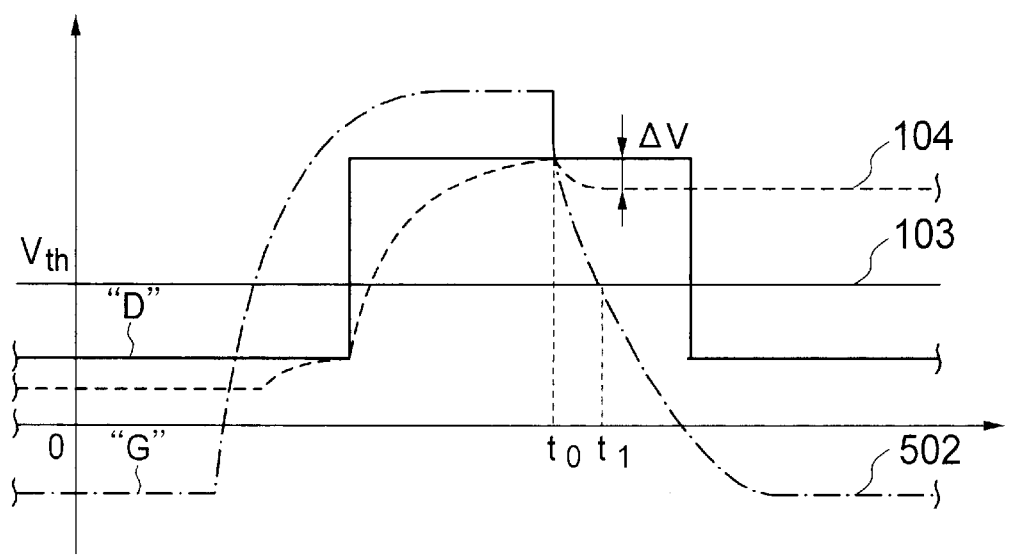
FIGS. 9A and 9B are waveform diagrams of the signals in the LCD panel of FIG. 1 in case of delays of the scanning voltage signal.
Figure 9B:
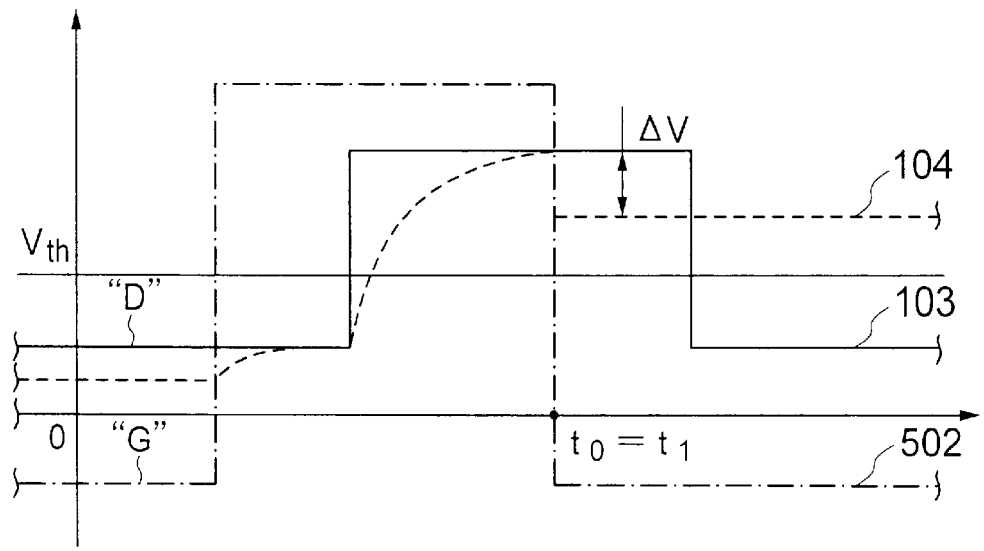
Figure 11:
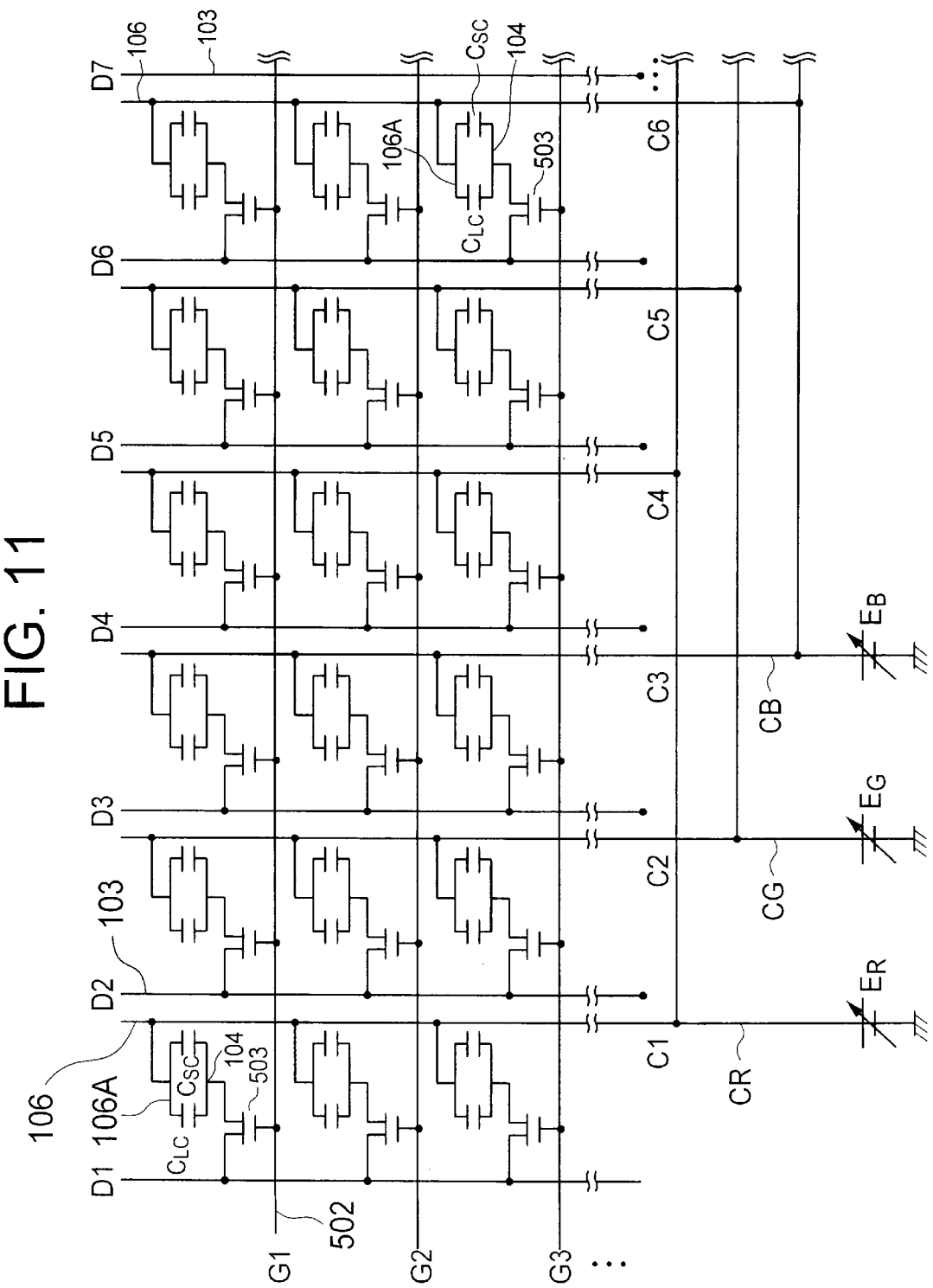
FIG. 11 is an equivalent circuit diagram of the LCD panel of the first embodiment.

Referring to FIG. 11 showing the equivalent circuit for the LCD panel of the present embodiment similarly to FIG. 4, each of the common electrode lines C1, C2, C3 . . . extends in the column direction and connected to pixels arranged in each column for specifying one of three colors. Each of three common electrode lines C1, C2 and C3, or C4, C5 and C6, or . . . is connected to a fourth common electrode line as counted from the each of the three common electrode lines. Thus, all the pixels defining one of the three colors are connected to a corresponding common electrode bus line CR, CG or CB, which is applied with a corresponding common voltage by a variable voltage source ER, EG or EB in the LCD driver.

In an alternative, if all the pixels arranged in a row specify one of the three colors, these pixels are connected together in the row direction by one of the common electrode lines.

Figure 12:
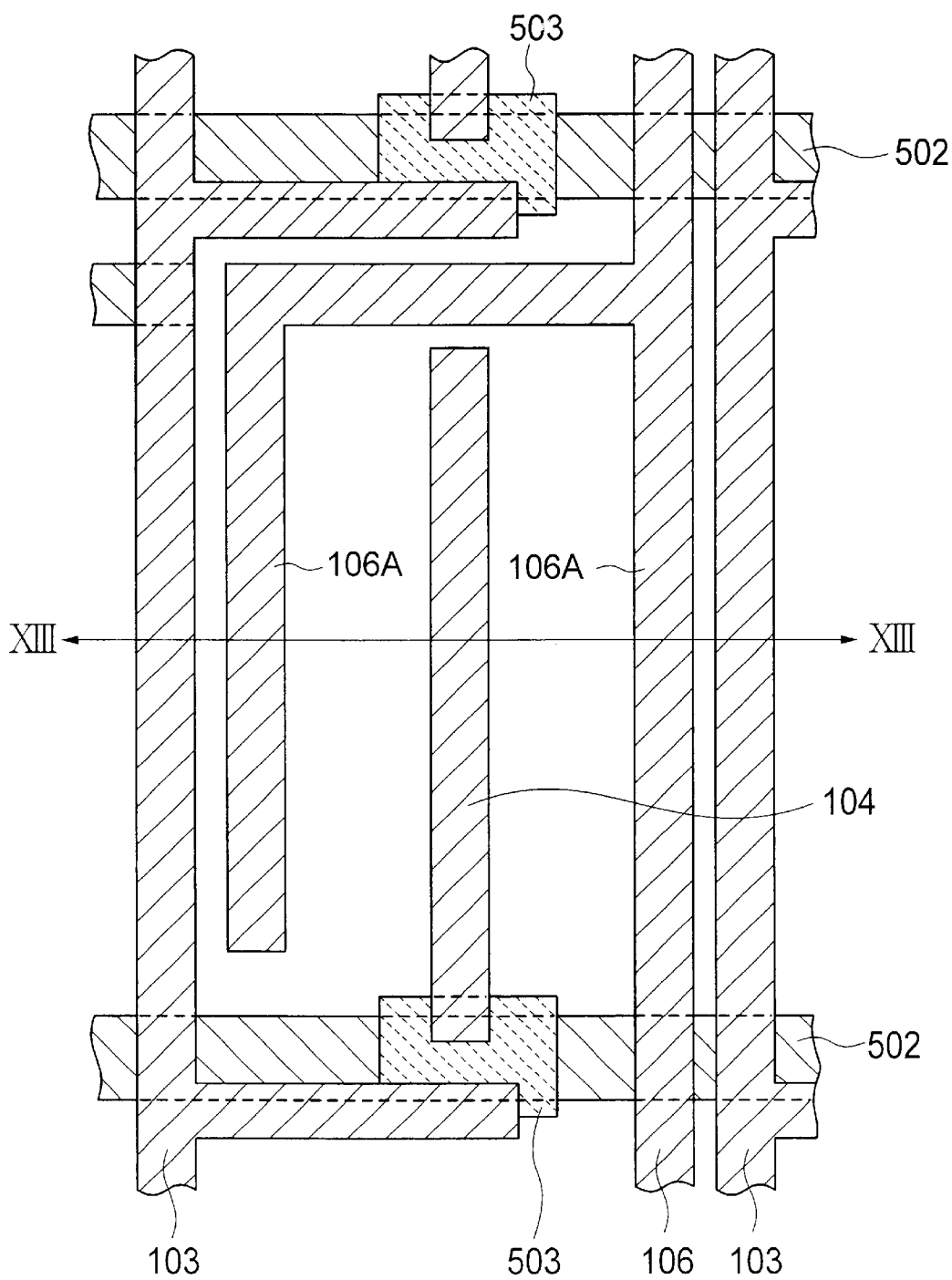
FIG. 12 is a front view of a pixel in the LCD panel of the first embodiment.

Referring to FIG. 12, each pixel of the LCD panel according to the present embodiment is similar to the pixel shown in FIG. 1 except for the common electrode line 106, which has a first electrode section 106A extending in a column direction to connect the pixels in the column and a second electrode section 106A extending from the first section 106A in each pixel. The first and second electrode sections 106A extend parallel to the pixel electrode 104 in the pixel for generating an in-plane electric field.

Figure 2:
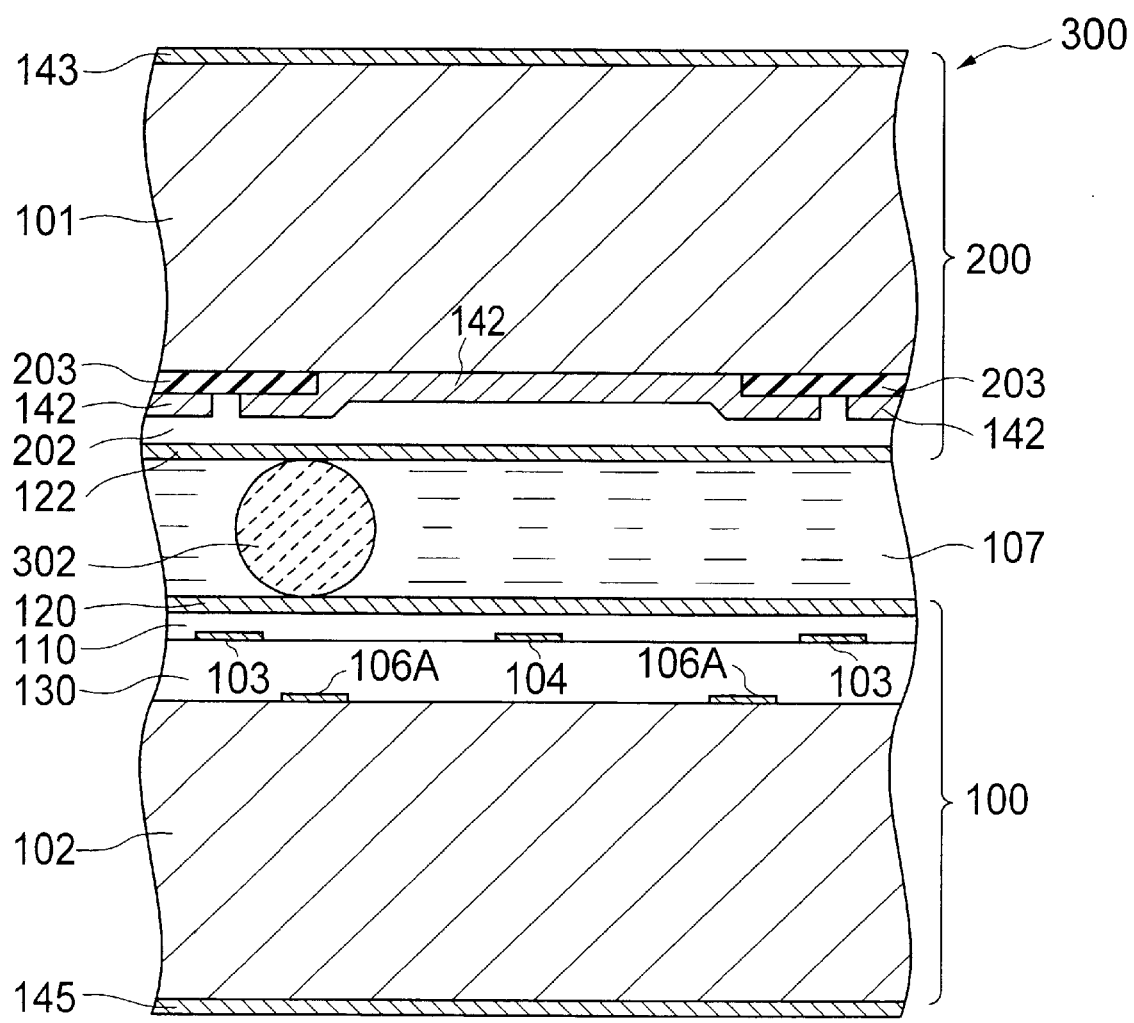
FIG. 2 is a sectional view taken along line II—II in FIG. 1.
Figure 3:
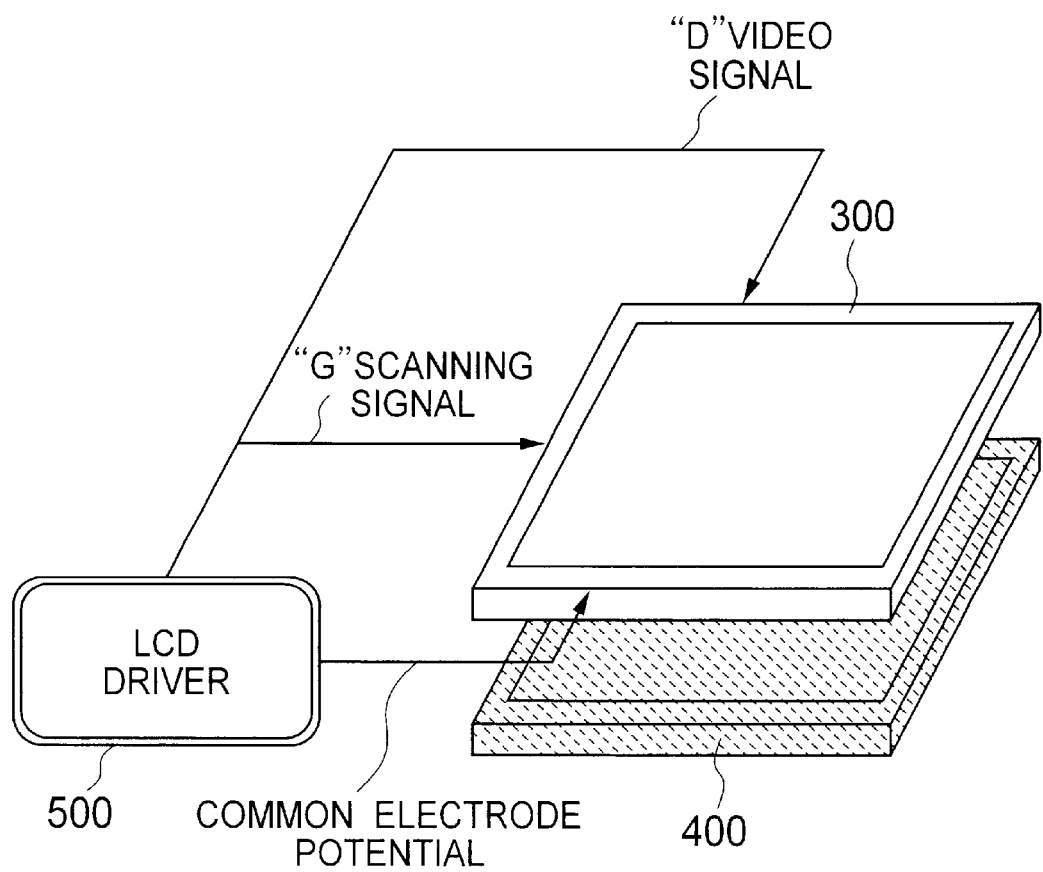
FIG. 3 is a schematic perspective view of a LCD device having a general in-plane switching mode LCD panel.
Figure 13:
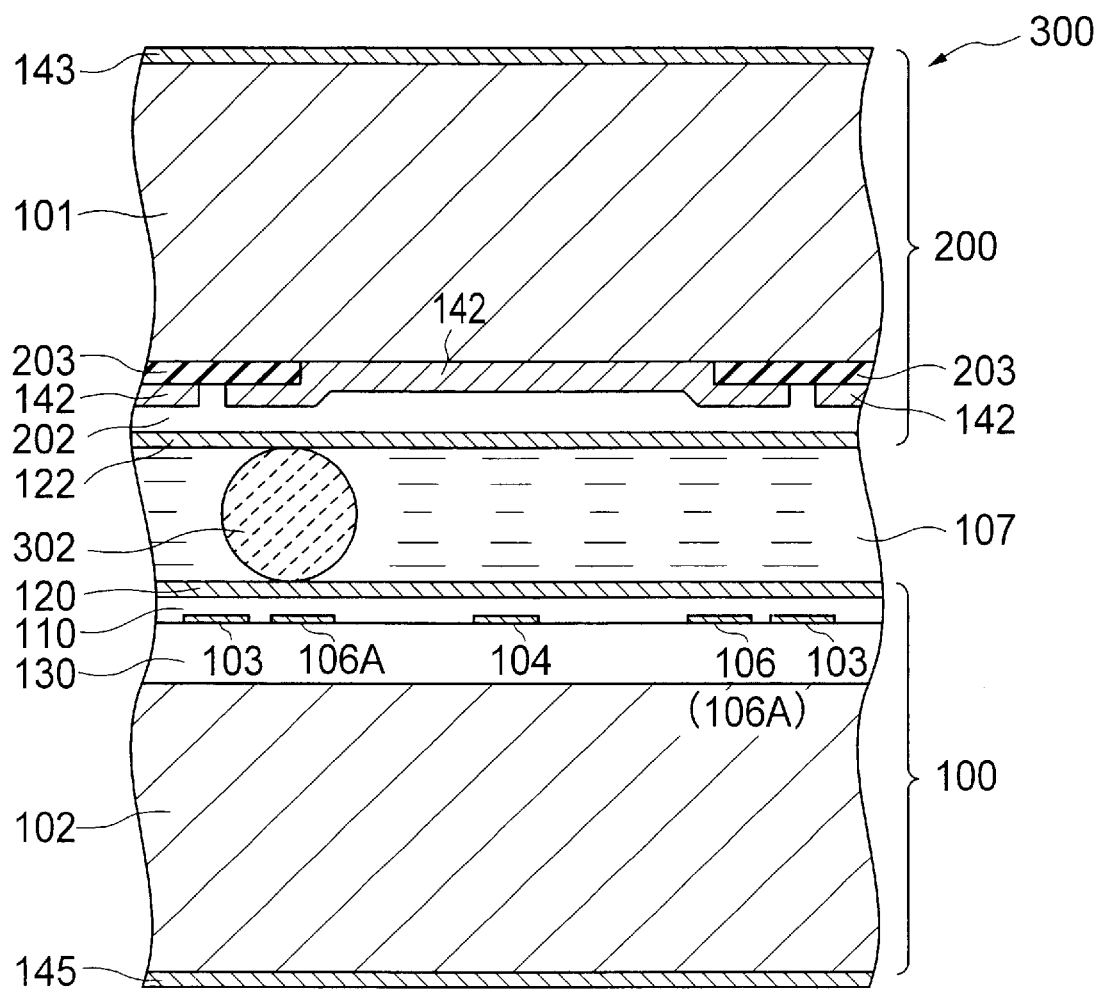
FIG. 13 is a sectional view taken along line XIII—XIII in FIG. 12.

Referring to FIG. 13 taken along line XIII—XIII in FIG. 12, the LCD panel has a structure similar to that shown in FIG. 2, except for the arrangement of the signal lines wherein the video signal line 103 and the common electrode line 106 are disposed in pair for each column on the gate insulator film 130, and the pixel electrode 104 is also disposed on the gate insulator film 130 between the pair of common electrode sections 106A. The signal lines and electrodes 103, 104, 106, 106A are covered with a protective film 110, on which an orientation layer 107 is formed by coating and rubbing.

The counter panel 200 is similar to the counter panel in the conventional LCD panel.

Back to FIG. 11, in a prototype LCD panel fabricated according to the first embodiment, the voltages of the three groups of common electrode lines C1, C2, C3, . . . (106) were adjusted independently of each other by the respective variable voltage sources ER, EG and EB, thereby reducing the DC voltage component between the pixel electrodes 104 and the respective common electrode 106A for all the three colors. By using these configurations, the level of the flicker could be significantly reduced. In addition, the reduction of the DC voltage components in the LC layer for each pixel prevented the burning, irregularity and stains therein. By selecting the materials for the color layers independently of the electric characteristics thereof, the color characteristics can be improved. The fabrication process can be conducted by using a conventional apparatus substantially without additional costs.

In the above embodiment, the common electrode lines 106 are grouped for respective color layers and applied with respective voltages. However, it is sufficient that the common electrode lines 106 for the pixels having a similar total capacitance $C_{LC}+C_{SC}$ between the pixel electrode 104 and the common electrode 106A be grouped.

Figure 14:
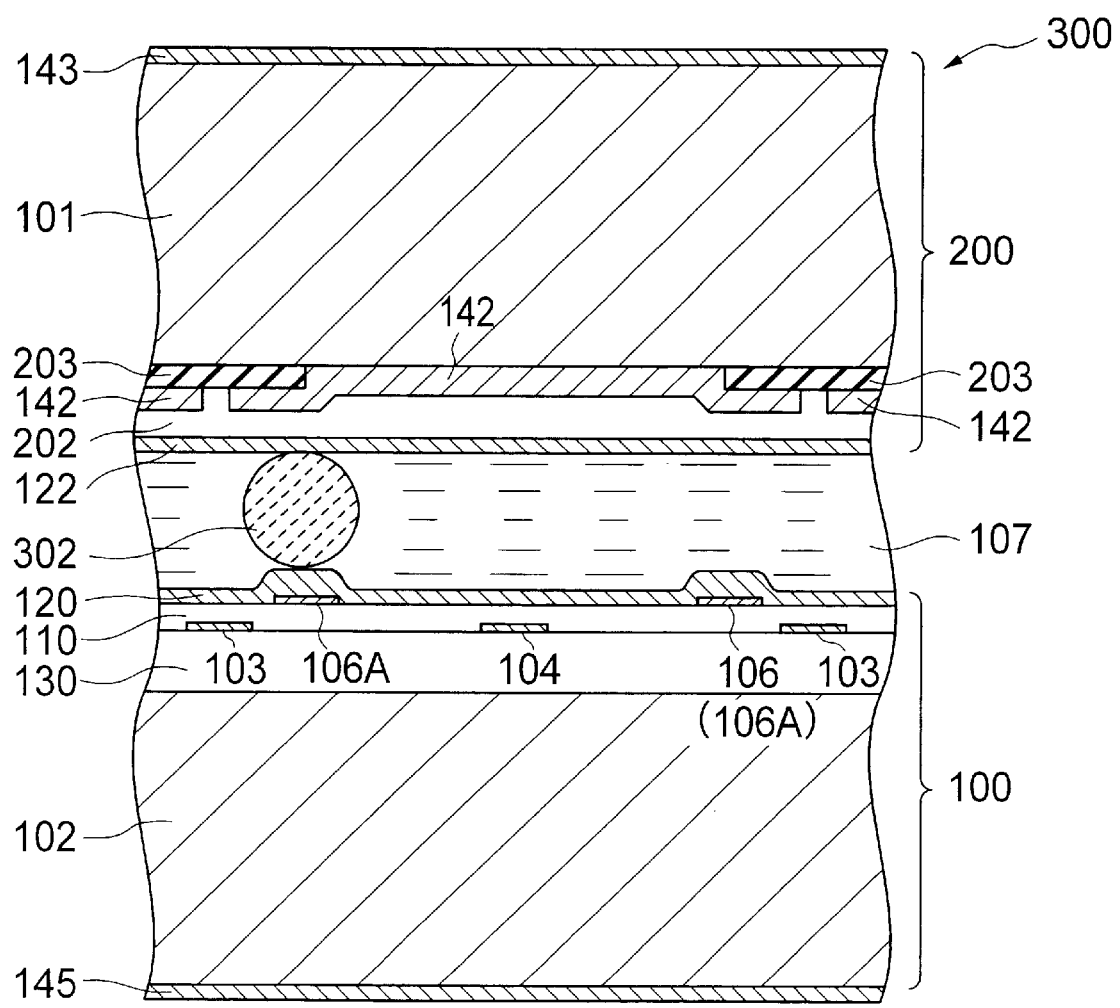
FIG. 14 is a sectional view of a LCD panel according to a second embodiment of the present invention.

Referring to FIG. 14, a LCD panel according to a second embodiment of the present invention is similar to the first embodiment except that the common electrode lines 106 are formed on the protective insulator film 110. FIG. 12 also shows the front view of the pixel of the LCD panel of the present embodiment. As in the case of the first embodiment shown in FIG. 11, three groups of common electrode lines C1, C4, C7, . . . and C2, C5, C8, . . . and C3, C6, C9, . . . specifying the three colors are applied with respective voltages for obtaining a minimum flicker level for each color by using the variable voltage sources ER, EG and EB, thereby reducing the DC voltage component between the pixel electrode 104 and the common electrode 106A for all the colors. This affords advantages similar to the first embodiment. In addition, the configuration of different layers for the common electrode lines 106 and the video signal lines 103 affords reduction of the possibility of a short-circuit failure therebetween, whereby the ratio of the number of defective products to the number of total products can be reduced.

Figure 15:
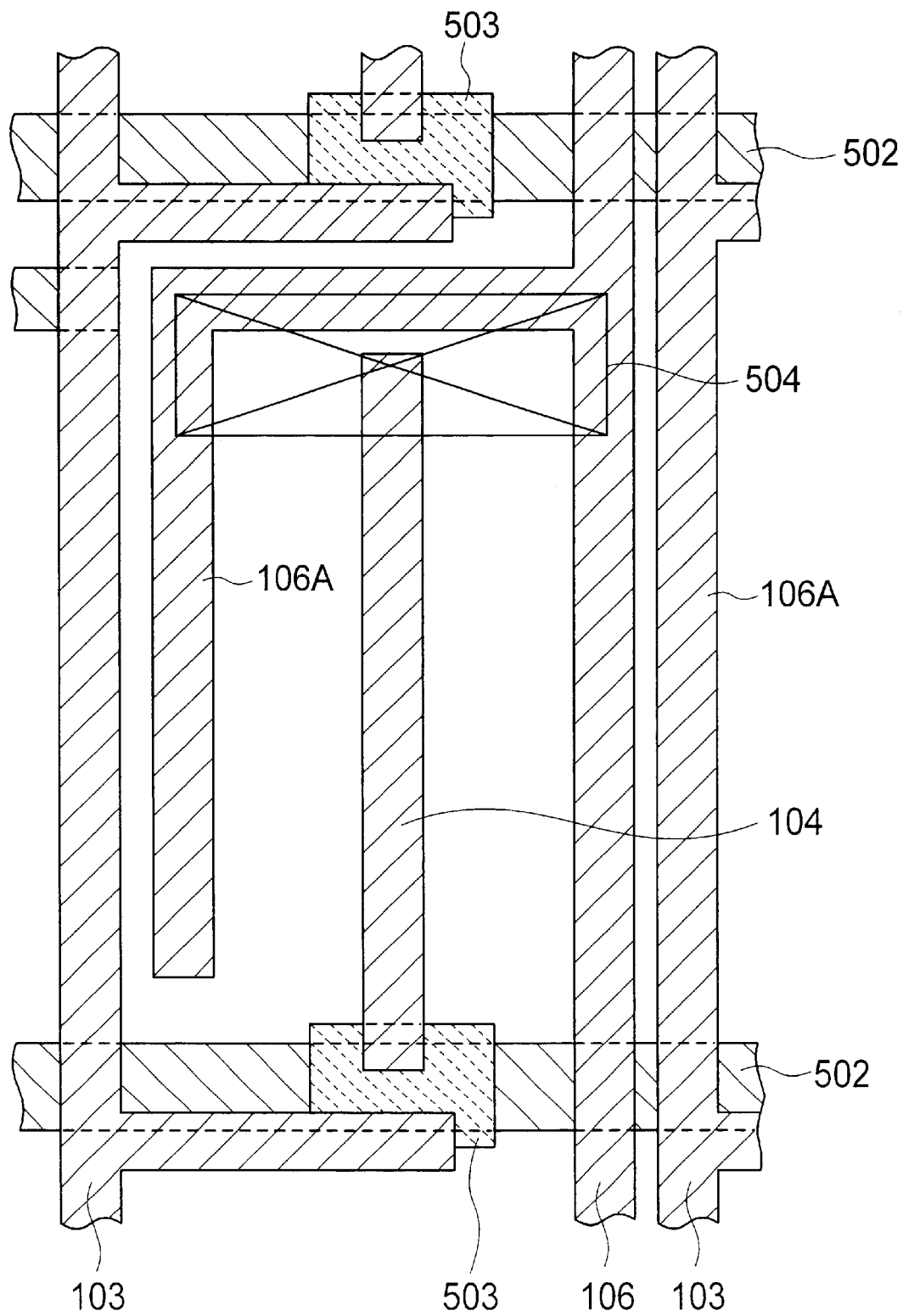
FIG. 15 is a front view of a pixel in a LCD panel according to a third embodiment of the present invention.

Referring to FIG. 15, a LCD panel according to a third embodiment of the present invention has column spacers 504 formed by patterning. The patterned column spacer 504 has a rectangular cross section. The configuration of the patterned column spacer is described in JP-A-5-224235, for example. It is to be noted that these column spacers are not necessarily formed in respective pixel areas in the LCD panel, which causes a difference in the total capacitance between the pixels however. In the present embodiment, the difference in the total capacitance can be compensated by applying respective voltages to the common electrode lines depending on the total capacitances between the pixel electrode and the common electrode line. That is, pixels, type "A", each having therein a patterned column spacer 504 are connected to a first group of common electrode lines 106 whereas pixels, type "B", each having therein no patterned spacer are connected to another group of common electrode lines 106.

Figure 16:
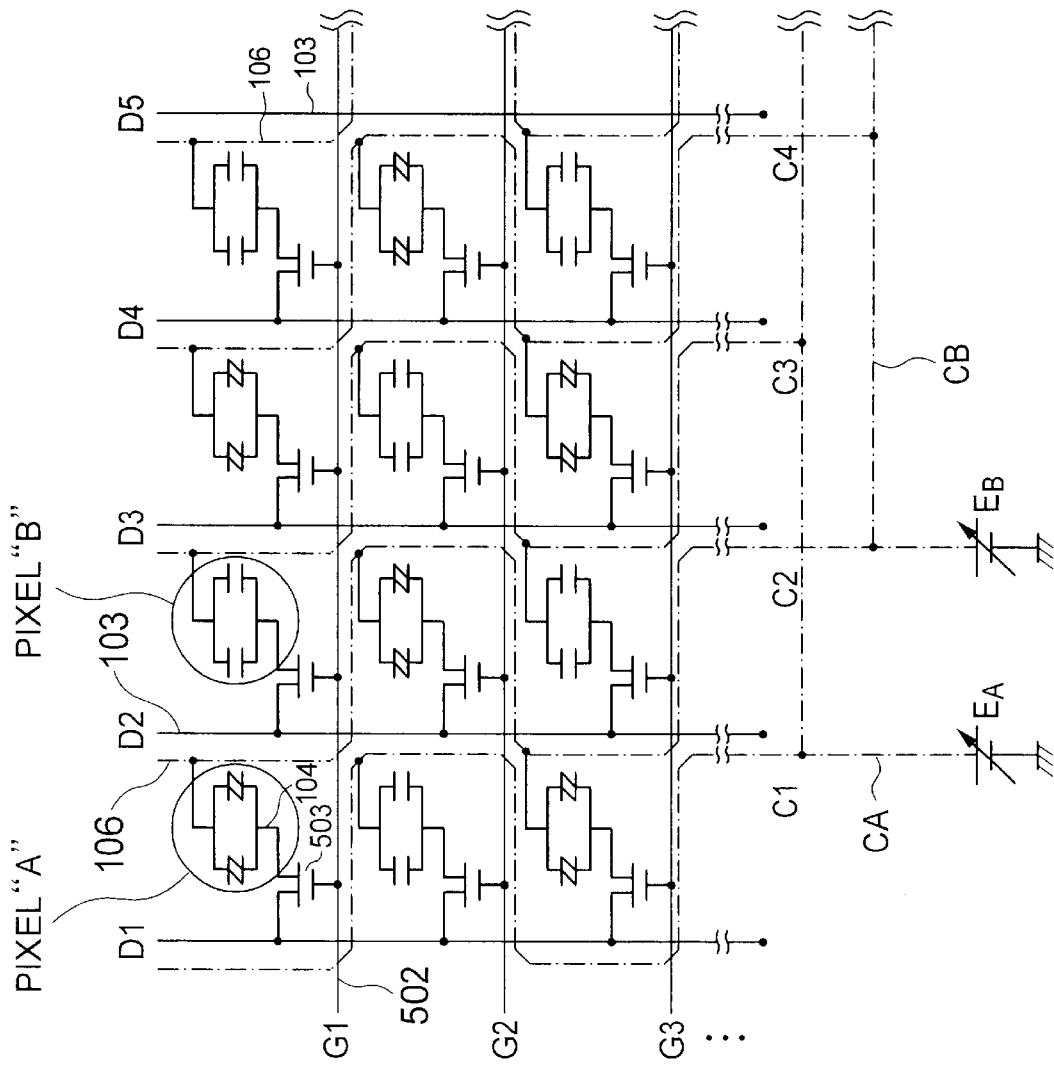
FIG. 16 is an equivalent circuit diagram for the LCD panel of FIG. 15.

More specifically, with reference to FIG. 16, each of the common electrode lines C1, C2, C3, . . . , for example common electrode line C2 extends in a zigzag line to be connected to a pixel "A" in a first column and first row, to be connected to next pixel "A" in a second column and second row, to be connected to next pixel "A" in the first column and third row, connected to next pixel "A" in the second column and fourth row, and so on, all of these pixels "A" having therein patterned spacers. The pixels "B" in the adjacent two columns are connected to common electrode line C3 which also extends in a zigzag line. The variable voltage sources $E_A$ and $E_B$ are adjusted so that the flicker level of the respective pixels "A" and "B" assume minimum values, thereby reducing the DC voltage components in all the pixels between the pixel electrodes 104 and the common electrode 106A. In a prototype LCD panel fabricated according to the third embodiment, the level of the flicker could be significantly reduced in all the pixels for the display area. The reduction of the DC voltage component also reduced the burning, the irregularity and the stains in the LC layer for the pixels.

The materials for the color layers can be selected independently of the electric characteristics thereof, whereby characteristics for the hue can be improved significantly. The fabrication process can be conducted by using a conventional apparatus substantially without additional costs.

In the previous embodiments, the common electrode lines are grouped for respective color layers and applied with respective voltages. As shown in the third embodiment, however, it is sufficient in the present invention that the common electrode lines for the pixels having a similar total capacitance between the pixel electrode 104 and the common electrode 106A be grouped.

Figure 17:
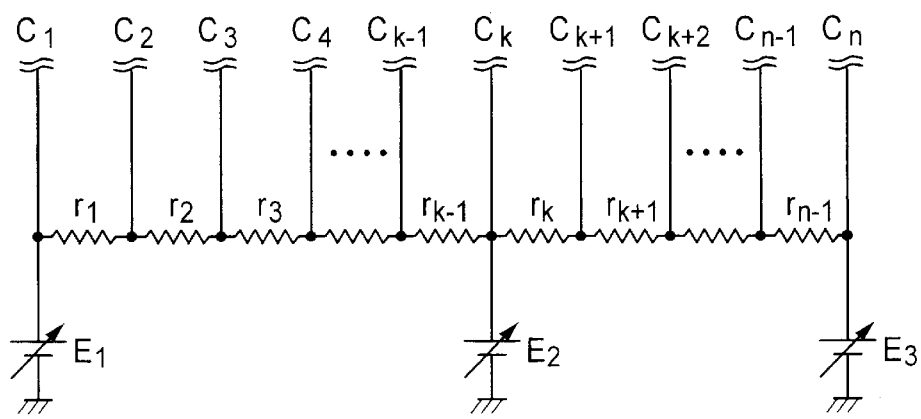
FIG. 17 is a circuit diagram of common electrode lines in a LCD panel according to a fourth embodiment of the present invention

Referring to FIG. 17, a LCD panel according to a fourth embodiment of the present invention reduces the flicker, burning, irregularity and stains caused by the difference in the feed-through voltage between the left side and the right side of the screen due to the delay in the scanning signal "G", as encountered in the conventional panel. In FIG. 17, common electrode lines C1 to $C_k$, and $C_{k+1}$ to Cn extend in the column direction, and connected to adjacent common electrode lines via respective resistors $r_1$ to $r_{k-1}$ and $r_k$ to $r_n$. Some common electrode lines, for example, three common electrode lines C1, Ck and Cn are applied with respective variable voltages E1, E2 and E3, which are independently adjusted by variable voltage sources disposed in the LCD driver.

The variable voltage sources E1, E2 and E3 are adjusted depending on the field-through voltages to control the potential of the common voltage lines 106. More specifically, the potentials of the common voltage lines 106 are adjusted so that the flickers assume minmum levels at each sampling point in the display area.

Figure 18:
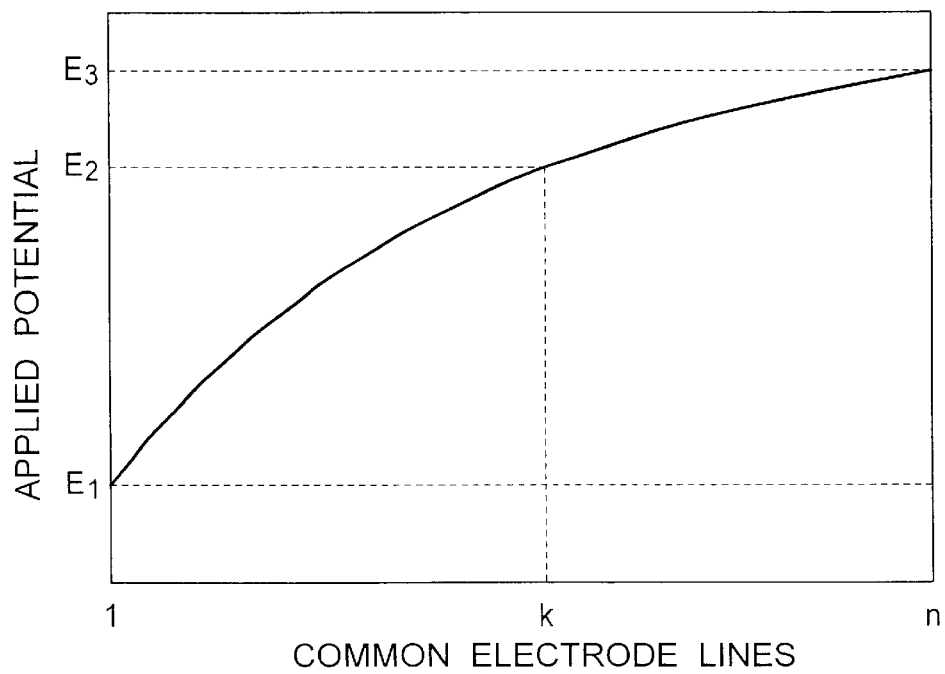
FIG. 18 is a graph for showing potentials of the common electrode lines in the LCD panel of FIG. 17.

Referring to FIG. 18, there are shown the potentials E1, E2 and E3 (E1<E2<E3) applied to the respective common electrode lines C1, Ck and Cn, with the potentials of the remaining common electrode lines 106 residing on a smooth curve between potentials E1 and E3, which curve is obtained by selecting suitable resistances for the resistors. A larger number of the variable voltage sources provide a more suitable design choice for the potential curve.

A LCD panel fabricated according to the present embodiment achieves a reduction of the flicker level and improved reliability of the LCD panel. By additionally applying the configuration of the second embodiment to the fourth embodiment, a larger delay of the scanning signal scarcely causes any flicker or reliability problem. Thus, gate lines can be made to have a smaller line width without involving the problems to achieve a higher rate of the opening to the pixel area. A smaller thickness for the gate lines can be also employed by reducing the irregularity of the surface of the gate lines, which affords a uniform orientation for the LC layer. By combining the first embodiment with these embodiments, a further improvement can be achieved.

In the above embodiments, if the scanning signal "G" is supplied from both the ends of the scanning line, a largest delay arises at the center of the scanning line. In this case, it is preferable to adjust the potential of the common electrode lines so that the common electrode line located at the center of the display area has a highest potential among the common electrode lines.

Since the above embodiments are described only for examples, the present invention is not limited to the above embodiments and various modifications or alterations can be easily made therefrom by those skilled in the art without departing from the scope of the present invention.

What is claimed is:

1. A liquid crystal display (LCD) panel assembly comprising:

a first panel;
a second panel; and
an LCD layer sandwiched therebetween,
said first panel including:
a first substrate;
a plurality of pixel elements arranged in a matrix on said first substrate, each said pixel element including a thin film transistor (TFT), a pixel electrode and a common electrode, said pixel electrode and said common electrode generating therebetween a lateral electric field parallel to a surface of said first substrate;
a plurality of common electrode lines each connected to corresponding common electrodes;
a plurality of scanning lines each disposed for a corresponding row of said pixel elements and connected to gates of said TFTs in the corresponding row; and
a plurality of video signal lines each disposed for a corresponding column of said pixel elements and connected to source/drain paths of said TFTs in said corresponding column,
said common electrode lines forming a plurality of groups each corresponding to said pixel elements having an equal total capacitance between said pixel electrode and said common electrode in the pixel elements, each of said groups being applied with a separate voltage independently of voltages applied to another of said groups.

2. The LCD panel as defined in claim 1, wherein each of said groups corresponds to one of colors of said pixel elements.

3. The LCD panel as defined in claim 2, wherein each of said common electrode lines extends in a direction along which one of the colors iteratively appears.

4. The LCD panel as defined in claim 2, wherein voltages applied to respective groups of said common electrode lines are adjusted so that a flicker level for said pixel elements defining one of the colors assumes a minimum.

5. The LCD panel as defined in claim 1, wherein one of said groups of common electrode lines corresponds to a group of said pixel elements having therein column spacers, and another of said groups of common electrode lines corresponds to another group of said pixel elements having therein no column spacers.

6. A liquid crystal display (LCD) panel assembly comprising:

a first panel;
a second panel; and
an LCD layer sandwiched therebetween,
said first panel including:
a first substrate;
a plurality of pixel elements each including a thin film transistor (TFT), a pixel electrode and a common electrode, said pixel electrode and said common electrode generating therebetween a lateral electric field parallel to a surface of said first substrate;
a plurality of common electrode lines each disposed for said pixel elements in a corresponding column and connected to corresponding said common electrodes;
a plurality of scanning lines each disposed for a corresponding row of said pixel elements and connected to gates of said TFTs in the corresponding row;
a plurality of video signal lines each disposed for a corresponding column of said pixel elements and connected to source/drain paths of said TFTs in said corresponding column;

a resistor connected between each adjacent two of said common electrode lines; and at least three nodes each connecting said resistor and said common electrode line being applied with separate voltages independently of each other, wherein said separate voltages and resistances of said resistors are selected so that one of said common electrode lines corresponding to proximal ends of said scanning lines is applied with a lower voltage compared to another of said common electrode lines corresponding to distal ends of said scanning lines, and wherein a center one of said at least three nodes has a higher voltage than either of said common electrode lines corresponding to said proximal ends and said common electrode lines corresponding to said distal ends.

7. A method of reducing flicker in a liquid crystal display (LCD) panel, said LCD panel having a plurality of pixel elements arranged in a matrix on said first substrate, each said pixel element including a thin film transistor (TFT), a pixel electrode and a common electrode, said method comprising:

categorizing said common electrodes of said pixel elements into groups, based on a capacitance between said pixel electrode and said common electrode; and applying a common electrode voltage to each said group, each said group having a different voltage level for said common electrode voltage.

8. The method of claim 7, wherein said categorizing is based on a pigment used for a color of said pixel.

9. The method of claim 7, wherein said categorizing is based on a configuration of spacers used in said panel, said spacers providing a separation of a thin film transistor (TFT) panel and a counter panel to allow a liquid crystal layer to be sandwiched between said TFT panel and said counter panel.

* * * * *